United States Patent Office 3,110,337
Patented Nov. 12, 1963

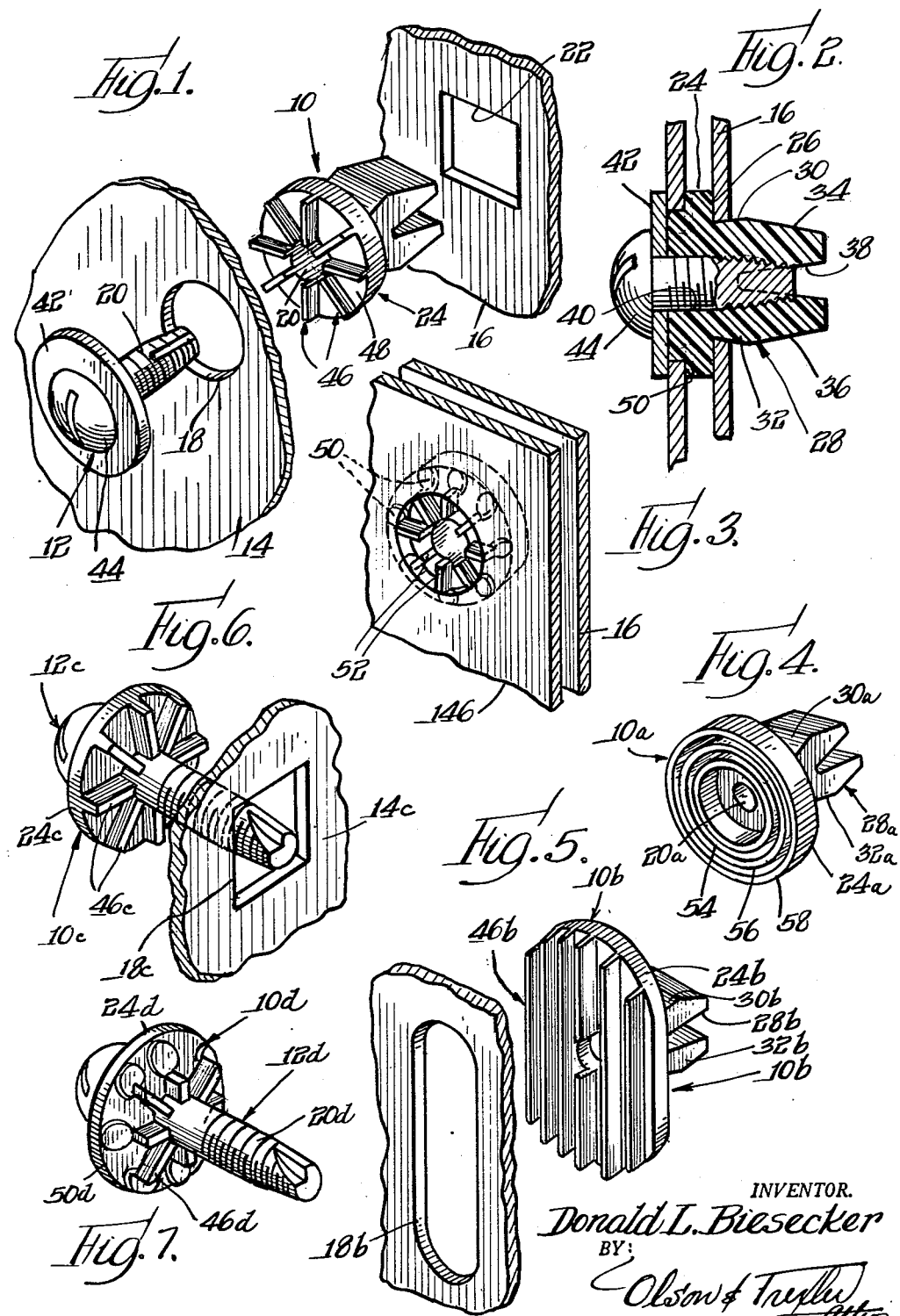

3,110,337
DEFORMABLE HEAD SCREW GROMMET
Donald L. Biesecker, Chicago, Ill., assignor to Illinois Tool Works Inc., a corporation of Delaware
Filed Feb. 29, 1960, Ser. No. 11,790
4 Claims. (Cl. 151—41.75)

The present invention relates to a novel fastening device and more specifically to a novel fastening structure suitable for connecting a plurality of apertured pieces.

While various uses for fastening means constructed in accordance with this invention may suggest themselves, they are particularly suitable for use in appliances and the like, for securing panels, body shells, cover plates and similar parts to frame or support members. In such installations it has frequently been the general practice to utilize a plurality of screws or bolts for securing a pair of mating parts together and to provide a plurality of pairs of aligned apertures in the parts for snugly accommodating these screws or bolts so that the parts will be held against relative lateral displacement, when the screws or bolts are fully assembled.

Considerable difficulty is encountered in forming a plurality of holes in one part of the appliance or work structure so that all of the holes are properly aligned with mating holes in another work structure. This problem is aggravated when one of the parts is a relatively thin sheet material or metal body shell or panel which may bend or buckle at least slightly so as to increase the chances of misalignment of the apertures. It will be appreciated that when the apertures and the parts to be joined are misaligned, it is frequently difficult, if not impossible, to insert connecting screws or bolts through all of the pairs of associated apertures.

It has been proposed to overcome the misalignment problems by forming oversized apertures in one of the parts to be joined, usually the body shell or similar member. In other words, these apertures are formed so that they have diameters or transverse dimensions substantially greater than the diameter of a screw to be inserted therethrough so as to provide adequate clearance for compensating for any misalignment with apertures in a mating part of the work structure. However, if such oversized apertures are used, the shank portions of the screws may not engage edges of the oversized apertures and thereby retain the part having the oversized apertures therein from slipping transversely of the other screws and relative to the mating part of the work structure. Also, it frequently is impossible or impractical to tighten the screws sufficiently to clamp the parts together in a manner which will restrain such slipping or lateral relative movement.

It is an important object of the present invention to provide a novel fastening structure adapted to solve the problem discussed above and more particularly adapted to be used for connecting mating parts, one of which has an oversized aperture therethrough, in a manner which positively prevents slippage of the parts relative to each other.

A more specific object of the present invention is to provide a novel fastener structure for use in connecting a pair of workpieces, one of which has an oversized aperture therethrough, which fastener structure is adapted to traverse the oversized aperture and engage edges thereof regardless of any misalignment between the workpieces for positively preventing slippage of the parts relative to each other.

A still further specific object of the present invention is to provide a novel fastener structure of the above described type including a plastic member adapted to be disposed along a side surface of a part having the oversized aperture therethrough and being adapted to be formed around edges of the oversized aperture for restraining lateral movement of the part relative to the plastic member.

A further object of the present invention is to provide a novel fastener structure of the above described type which is also adapted to provide a resilient locking action for resisting unauthorized loosening of the fastener.

Still another object of the present invention is to provide a novel fastener structure of the above type which is adapted to secure a pair of workpieces in spaced apart relationship and in a manner which minimizes vibration noises and the like, during operation of an appliance of which the workpieces are a part.

A further object of the present invention is to provide a novel fastener structure of the above described type including a one-piece plastic grommet or anchor member adapted to be snapped through an aperture in one workpiece for accommodating a screw and further adapted to engage a second workpiece within an oversized aperture thereof for restraining slippage between the workpieces.

Other objects and advantages of the present invention will become apparent from the following description and accompanying drawings wherein:

FIG. 1 is an exploded perspective view showing a fastener structure incorporating features of the present invention in position for assembly with a pair of workpieces to be connected;

FIG. 2 is a fragmentary partial sectional view showing the fastener structure and workpieces fully assembled;

FIG. 3 is a fragmentary perspective view showing the workpieces and plastic anchor member of the present invention in assembled relationship with the screw removed for facilitating disclosure of a feature of the invention;

FIG. 4 is a perspective view showing a fastener device incorporating a modified form of the present invention;

FIG. 5 is a perspective view showing a fastener device incorporating another modified form of the present invention and a workpiece having an elongated aperture with which the device is particularly adapted to be used;

FIG. 6 is a fragmentary perspective view showing a fastener structure incorporating another modified form of the present invention; and FIG. 7 is a perspective view showing the device of FIG. 6 and the condition it assumes after being tightened against a workpiece having an oversized aperture therethrough.

Referring now more specifically to the drawings wherein like parts are designated by the same numerals throughout the various figures, a fastener structure incorporating one embodiment of the present invention is shown in FIGS. 1–3 and comprises a one-piece plastic grommet or anchor member 10 adapted to accommodate a complementary threaded screw 12. The fastener member or grommet 10, which will be described in detail below, is preferably molded from a tough, resilient plastic material such, for example, as nylon.

The anchor member 10 and the screw 12 are adapted to be used for connecting a workpiece 14 with a second workpiece or support member 16. While only portions of these workpieces are shown, it is to be understood that they may be parts of appliances or work structures of the type discussed above. For example, the workpiece 14 may be a body shell or panel of an appliance while the workpiece 16 may be a frame member to which the body shell is to be secured. It is to be noted that the workpiece 14 is provided with an oversized aperture 18 through which a threaded shank portion 20 of the screw 12 may be inserted, and the workpiece or frame member 16 is provided with an aperture 22 into which the grommet 10 may be inserted. It is to be understood that the workpieces may be provided with a plurality of pairs of the apertures 18 and 22 disposed in spaced apart relationship for accommodating additional fastening devices, not shown, identical to the anchor member or grommet 10 and the screw 12.

The plastic fastener element or grommet 10 is formed with a radially enlarged head portion 24 having a radially extending clamping surface 26 which is engageable with one side of the workpiece 16 as shown in FIG. 2. A shank portion 28 extends axially from the head portion 24 for entry through the aperture 22 in the workpiece. The shank portion is formed with a polygonal exterior cross-section for co-operative engagement with edges of the polygonal or rectangular aperture 22 for preventing rotation of the fastener member or grommet relative to the workpiece 16.

Opposite sides of the grommet shank portion are provided with surfaces or shoulder means 30 and 32 flowing outwardly away from integral junctions with the head portion 24 for engaging behind the workpiece when the shank portion is inserted through the aperture 22 for retaining the grommet in assembled relationship with the workpiece. The maximum distance between outer end portions of the shoulder surfaces 30 and 32 is greater than the width of the aperture 22 so that the shank portion and the shoulder surfaces or means 30 and 32 must be radially collapsed in order to permit the shoulder means to be snapped through the workpiece.

In order to facilitate insertion of the shank portion through the workpiece aperture, opposite side surface portions 34 and 36 taper inwardly from junctions with the shoulder surfaces 30 and 32. Furthermore, a slot 38 is formed so that it traverses the shank portion between the opposite side surfaces 34—36 and also at least partially between the opposite shoulder surfaces 30 and 32 for facilitating radial or lateral collapsing of the shank portion during application to the workpiece.

The fastener element or grommet 10 is provided with a central aperture or bore 40 extending through both the head portion 24 and the shank portion 28 for receiving the shank 20 of the screw 12. Preferably the bore 40 is initially unthreaded and has a smooth wall with a diameter less than the crest diameter of the helical thread convolutions on the threaded screw shank 20. Thus, when the screw is assembled with the grommet as shown in FIG. 2, complementary thread convolutions will be formed by the screw in the wall of the bore 40 and at the same time the screw will exert a radial force tending to expand the shank portion 28 and urge the shoulder means 30 and 32 aggressively into engagement with the workpiece 16 for even more securely connecting the grommet with the workpiece.

As discussed above, it frequently happens that the apertures 18 and 22 in the workpieces do not align perfectly when the parts are assembled together. Therefore, the present invention contemplates that the aperture 18 will be oversized or, in other words, will have a diameter or transverse dimensions substantially greater than the diameter of the shank 20. This feature provides ample clearance around the screw shank for enabling the screw to be easily applied to the anchor member or grommet 10, regardless of whether or not the aperture 18 is perfectly aligned with the aperture 22 and thus the grommet. A washer 42 is assembled on the screw shank adjacent a head portion 44 of the screw for traversing the oversized aperture 18 and overlying an outer surface of the workpiece 14 and retaining the workpiece when the screw is applied to the fastener member or grommet 10.

It is to be noted that in accordance with an important feature of the present invention, the plastic fastener member or grommet 10 is provided with means adapted to project within the oversized aperture 18 and engage the edges thereof and thereby prevent the workpiece 14 from slipping in a direction extending transversely of the screw shank 20. In the embodiment shown in FIGS. 1–3, this means comprises a plurality of radially disposed fins 46 formed integrally with and spaced around an outer end 48 of the head portion 24. As shown best in FIG. 1, these fins are initially substantially straight and extend between inner and outer margins of the generally annular head portion 24 so that they are adapted completely to traverse the oversized aperture 18, which, of course, has a diameter less than the diameter or transverse dimension of the head portion 24. In addition, the fins 46 project axially, outwardly from the outer end 48 of head portion 24 a distance which is preferably at least about equal to the thickness of the workpiece or panel 14.

When the parts are assembled as shown in FIGS. 2 and 3, it will be noted that even though the aperture 18 is not perfectly aligned with aperture 22 and grommet 10, radially outwardly disposed portions 50 of the fins or ribs 46 extend beyond the edges of the aperture 18 and engage the back or inner surface of the workpiece 14 and radially inwardly disposed portions 52 of the fins or ribs are in alignment with the aperture 18. As indicated above, the plastic material of the grommet is tough but resiliently deformable. Thus, when the screw 44 is tightened, the workpiece 14 is forced against the covered portions 50 of the fin or narrow ribs so that these portions are substantially flattened against the outer end surface 48 of the grommet head, as shown in FIGS. 2 and 3. At the same time, the radially inwardly disposed portions 52 of the ribs or fins continue to project axially and are, in effect, formed around the edge portions of the aperture 18 also, as shown in FIGS. 2 and 3. The fins or ribs thus provide abutment means extending within and completely traversing the aperture 18 and firmly engaging the edges thereof for retaining the workpiece 18 in a fixed relationship with respect to the grommet 10.

When the parts are fully assembled, as shown in FIGS. 2 and 3, it is seen that the head portion 24 and the flattened portions 50 of the ribs or fins provide means spacing the workpiece 36 from the support or frame member 16. In addition, the resiliency of the flattened rib or fin portions provides a cushioned support for the workpiece 14 which, along with the spacing of the workpiece from the frame member, aids in reducing or eliminating vibration noises which might otherwise occur in the appliance or apparatus of which the workpieces are a part. The resiliency of the compressed ribs or fins also provides a spring action tending to place the screw under tension for causing the threads of the screw to bind with the complementary threads formed in the grommet for frictionally locking the screw against unauthorized retrograde rotation.

FIG. 4 shows a modified form of the present invention which is similar to the structure described above as indicated by the application of identical reference numerals with the suffix "a" added to corresponding parts. This embodiment differs only in that the head portion of the plastic grommet is provided with a plurality of narrow annular ribs or fins 54, 56 and 58 substantially concentrically arranged in spaced relationship. These ribs or fins are also resiliently deformable and function in substantially the same manner as the ribs 46 described above.

FIG. 5 shows an embodiment 10b which is identical to the structure described above except that it is particularly adapted for use with the workpiece having an elongated aperture 18b therein, as distinguished from a circular aperture such as that shown in FIG. 1. Thus, in this embodiment the head portion 24b is elongated so that it may completely traverse the major as well as minor axes of the elongated aperture 18b, and the narrow resiliently deformable fins 46b are disposed in parallel relationship and extend lengthwise of the head portion.

FIGS. 6 and 7 show another embodiment of the present invention in which elements corresponding to those described above are designated by the same reference numeral with the suffix "c" added. This embodiment differs in that the plastic fastener element 10c is adapted to be pre-assembled with the screw 12c for application outwardly rather than inwardly of the workpiece 14. Furthermore, in this embodiment the screw 12c may be threaded directly into an opening formed in the associated support member or, if desired, any other suitable device may be utilized for connecting the screw with the support member.

In this embodiment the fastener element 10c comprises an annular portion 24c retained by the screw head and adapted to traverse the oversized aperture and to be clamped against the outer surface of the workpiece. Narrow resiliently deformable ribs 46c project axially from the inner or clamping side of the annular washer-like portion 24c, which ribs are adapted to be formed around the edge of the aperture in the same manner as the corresponding ribs or fins. FIG. 7 shows the ribs in the condition they attain after being formed around the edges of the aperture described above. It will also be appreciated that in some instances the device 10c could be assembled between the workpiece 14c and the support structure and, of course, reversed so that the ribs would project outwardly into the oversized aperture. In such an installation the device 10c would, like the head portion of the device described above, serve to space the workpiece 14c from the support member.

While the preferred embodiments of the present invention have been shown and described herein, it is obvious that many structural details may be changed without departing from the spirit and scope from the appended claims.

The invention is claimed as follows:

1. A plastic fastener member of the type described for use in connecting a first workpiece having an elongated oversized aperture therethrough to a second workpiece, said fastener member comprising a radially elongated section having an aperture therein for accommodating a shank of a device such as a screw and the like insertable through the oversized workpiece aperture and having a diameter substantially smaller than transverse dimensions of the workpiece aperture, said section having a transverse dimension greater than a corresponding transverse dimension of said oversized workpiece aperture, and a plurality of narrow parallel resiliently and axially deformable plastic fins projecting axially from said section and extending longitudinally of said elongated section and respectively extending over an axially facing end of said section, at least some of said elongated fins projecting partially within the oversized elongated aperture and partially against a surface of said first workpiece surrounding said oversized aperture and for being formed around an edge of the oversized aperture for restraining lateral displacement of said first workpiece fastener member when said first workpiece and said fastener member are relatively clamped together.

2. A fastener structure for connecting a first workpiece having a first aperture of predetermined transverse dimensions therethrough and a second workpiece having a second aperture therethrough, said fastener structure comprising a screw having a threaded shank insertable through said apertures and having a diameter substantially less than said transverse dimensions of said first mentioned aperture for accommodating partial misalignment of said apertures, and a one-piece resiliently deformable plastic fastener member including an apertured generally radially extending portion snugly receiving the threaded shank of said threaded screw, said apertured portion having transverse dimensions greater than transverse dimensions of said first mentioned workpiece aperture and being disposed for completely traversing said first mentioned workpiece aperture when the fastener structure is assembled with the workpieces, a shank portion extending axially from said radially extending portion for entry into said aperture in said second workpiece, said radially extending portion being engageable with one side of said second workpiece, and shoulder means on said shank portion of said plastic fastener member engageable with an opposite side of said second workpiece for connecting said plastic fastener member with said second workpiece, said aperture in said radially extending portion of the plastic member extending into said shank portion of the plastic member and initially having a diameter less than said diameter of the screw shank for enabling interengagement between the screw shank and the plastic member, and a plurality of narrow resiliently and axially deformable plastic fins integral with and projecting axially from said apertured portion on the side opposite said shank portion and distributed over an axially facing end of said apertured portion, at least some of said fins projecting partially within said first mentioned workpiece aperture and partially against a surface of said first mentioned workpiece surrounding the aperture and for being formed around an edge of said first mentioned workpiece aperture for resisting lateral displacement of said first mentioned workpiece relative to the fastener structure when the fastener structure is fully applied to said workpiece.

3. A one piece resiliently deformable plastic fastener member of the type described for use in connecting a workpiece having an oversized aperture therethrough to a second workpiece, said fastener member comprising a radially extending head portion adapted to be disposed between said workpieces and against said second workpiece, a shank portion extending axially from said head portion for insertion through an aperture in said second workpiece, collapsible and expandable laterally extending shoulder means at opposite sides of said shank portion for engaging said second workpiece oppositely from said head portion and securing said fastener member with respect to said second workpiece when the shank portion is inserted through said second workpiece aperture, means providing an aperture extending axially through said head and shank portions for accommodating a screw inserted through said oversized aperture in said first mentioned workpiece, and a plurality of narrow resiliently and axially deformable plastic fins integral with and projecting axially outwardly from said head portion from the side opposite said shank portion a distance greater than their thickness, at least some of said fins including portions for projecting partially within said oversized aperture and partially against a surface of said first workpiece surrounding said oversized aperture and being deformable around an edge of said oversized aperture for restraining displacement of said first workpiece transversely of said fastener member when said first workpiece is forced against said fin means upon tightening of a screw applied to said fastener member said fin means being substantially spaced from each other at junctions thereof with said head portion for promoting collapsing of portions of the fin means which engage said first workpiece.

4. A one piece plastic fastener member of the type described for use in connecting a first workpiece having an oversized aperture therethrough to a second workpiece, said fastener member comprising a first section having an aperture therein for accommodating a shank of a device such as a screw and the like insertable through the oversized workpiece aperture, said section aperture having a diameter substantially smaller than the transverse dimensions of the workpiece aperture, a shank section integral with said first section extending axially from one end thereof and having a shoulder formation for attachment to a second workpiece, said first section having a transverse dimension greater than the corresponding transverse dimensions of said oversized workpiece aperture, means for providing increased shear strength to the assembly of said fastener member to said workpiece having an oversized aperture comprising a plurality of axially projecting narrow resilient fins integral with said first section and projecting from the side of said first section opposite to said shank section and which is adapted to initially receive said screw, said axially projecting fins being spaced from each other as measured along a circular line substantially concentric with the aperture in said first section and opposite to said shank section, at least some portion of said projecting fins being adapted for projecting partially within the oversized aperture and partially against a surface of said first workpiece surrounding said oversized aperture and for being deformed around an edge of the oversized aperture for restraining lateral displacement of said first workpiece fastener member when said first workpiece and said fastener member are relatively clamped together.

References Cited in the file of this patent

UNITED STATES PATENTS

| | | |
|---|---|---|
| 612,394 | Bernardi | Oct. 18, 1898 |
| 2,257,538 | Schlueter | Sept. 30, 1941 |
| 2,439,516 | Holcomb | Apr. 13, 1948 |
| 2,756,795 | Clingman | July 31, 1956 |
| 2,788,047 | Rapata | Apr. 9, 1957 |
| 3,030,997 | Collins | Apr. 24, 1962 |

FOREIGN PATENTS

| | | |
|---|---|---|
| 328,001 | Germany | Oct. 20, 1920 |